United States Patent
Wrede et al.

[11] Patent Number: 5,937,040
[45] Date of Patent: Aug. 10, 1999

[54] METHOD AND APPARATUS FOR USING A D-CHANNEL FOR DISPLAYING USER DATA

[75] Inventors: Uwe Wrede; Mieu Hong Dang, both of San Jose; Shmuel Shaffer, Palo Alto, all of Calif.

[73] Assignee: Siemens Information and Communication Networks, Inc., Boca Raton, Fla.

[21] Appl. No.: 08/844,417

[22] Filed: Apr. 18, 1997

[51] Int. Cl.⁶ .................................................. H04M 11/00
[52] U.S. Cl. ................................. 379/93.23; 379/93.17; 379/100.01; 370/524
[58] Field of Search ............................ 379/93.01, 93.05, 379/93.09, 93.17, 93.23, 93.14, 93.15, 100.01, 100.13; 370/522, 524, 465, 466, 467

[56] References Cited

U.S. PATENT DOCUMENTS

| | | | |
|---|---|---|---|
| 5,067,125 | 11/1991 | Tsuchida | 370/466 |
| 5,101,427 | 3/1992 | Kotani et al. | 379/100.14 |
| 5,164,982 | 11/1992 | Davis | 379/93.17 |
| 5,333,266 | 7/1994 | Boaz et al. | 395/200 |
| 5,341,377 | 8/1994 | Ohtani | 370/110.01 |
| 5,351,276 | 9/1994 | Doll, Jr. et al. | 379/88.17 |
| 5,416,834 | 5/1995 | Bales et al. | 379/211 |
| 5,432,837 | 7/1995 | Engelke et al. | 379/52 |
| 5,490,251 | 2/1996 | Clark et al. | 395/200.67 |
| 5,572,524 | 11/1996 | Harada et al. | 370/468 |
| 5,583,922 | 12/1996 | Davis et al. | 379/93.09 |
| 5,608,788 | 3/1997 | Demlow et al. | 379/142 |
| 5,615,213 | 3/1997 | Griefer | 370/412 |

*Primary Examiner*—Curtis A. Kuntz
*Assistant Examiner*—Melur Ramakrishnaiah

[57] ABSTRACT

A telecommunications method and apparatus for sending non-protocol messages from a source to a remote phone terminal having a display includes converting the messages at the source into a format that is compatible with transmission via a signaling channel of a telecommunications line having at least one digital user data channel in addition to the signaling channel. For example, the telecommunications line may be an ISDN link. The formatted messages are visually displayed at the remote phone terminal. As examples, the messages may be menu options of an interactive voice response unit, facsimile documents of a facsimile server, or voicemail messages of a voicemail server.

20 Claims, 5 Drawing Sheets

METHOD AND APPARATUS FOR USING A D-CHANNEL FOR DISPLAYING USER DATA

BACKGROUND OF THE INVENTION

The invention relates generally to methods and apparatus for presenting messages to a party via a telephone network and more particularly to transmitting messages using a digital communications line having at least one user data channel and a separate signaling channel.

DESCRIPTION OF THE RELATED ART

Digital telephones provide features that are typically not available to a user of a conventional analog telephone. The higher bandwidth that is available when using digital communications lines accommodates the addition of advanced features. An Integrated Services Digital Network (ISDN) includes at least two B-channels that carry user data and includes a D-channel that carries signaling information. Each of the B-channels is a 64 Kbps digital channel, while the D-channel may have a bandwidth of 16 Kbps or 64 Kbps. A Basic Rate Interface (BRI) has two B-channels and a single Kbps D-channel, and is therefore sometimes referred to as a 2B+D interface to ISDN. The effective bandwidth of a BRI is 144 Kbps. Even greater bandwidth can be achieved using a Primary Rate Interface (PRI) that consists of either 23 or 30 B-channels for user data and a single 64 Kbps D-channel for the signaling information. The 23B+D interface is used in North America and in Japan to provide an effective bandwidth of 1.544 Mbps, while the 30B+D method is used in Europe to provide an effective bandwidth of 2.048 Mbps.

Most of the signaling information that is passed along a D-channel is connectivity-related. That is, the D-channel carries call messages that are often transparent to the parties and relate directly to telephony signal exchanges. Examples of connectivity-related messages that are transmitted via the D-channel include CONNECT, CONNECT ACKNOWLEDGE, DISCONNECT, and RELEASE signals. However, not all of the connectivity-related messages are transparent to the parties of a call. Some digital telephones include display capability. Information regarding an incoming call may be displayed on a readout, such as a Liquid Crystal Display (LCD). This displayed connectivity-related information may include an identification of the telephone number and even the name of the calling party. Moreover, if an incoming call has been sent, the connectivity-related message may include the originally called telephone number and the reason for sending, e.g., sending from a ring-busy telephone or a ring-no-answer telephone.

The B-channels of an ISDN carry the user data. For ordinary telephone calls, the user data is digitized voice information. Digital transmissions are less susceptible to transport-induced distortion than analog transmissions. Additionally, any distortion that is induced is more easily filtered.

The user data that are transmitted via the B-channels of an ISDN may be facsimile data. Documents may be sent to a server and stored for later retrieval. An individual who identifies a particular document and/or provides a password is sent one or more documents. Conventionally, retrieval requires a facsimile machine or a personal computer having modem capability. Thus, the availability of the required equipment limits the ability of a user to download facsimile documents.

In addition to realtime voice information, user data transmitted via B-channels of an ISDN include recorded voice information. For example, the B-channel voice information may be voicemail sent from a server. A voicemail server operates in a manner equivalent to the facsimile server. As another example of sending recorded voice information, voice prompts of an interactive voice response (IVR) unit are transmitted via B-channels. The IVR presents messages to a caller, with the caller being prompted to depress certain buttons on a keypad of a phone in order to make selections. For example, a pay-per-view facility may present a decision tree in which one menu level is used to specify a type of movie and a subsequent menu level is used to select a particular movie. A concern in the presentation of voice information to a caller is that it sometimes requires a relatively high degree of comprehension. Another concern is that a caller may sometimes have difficulty in hearing the voice information. For example, a caller in a noisy environment may miss portions of a voice message. In another example, the caller may be hearing impaired and, therefore, unable to use a pay-per-view facility or other IVR unit unless specialized equipment is accessed, such as a Telecommunications Device for the Deaf (TDD). However, such specialized equipment is often cost prohibitive.

What is needed is a method and apparatus for sending user data to increase accessibility to messages and to enhance reliability and comprehensibility of the messages.

SUMMARY OF THE INVENTION

A telecommunications method of sending user data during a call between a source of messages and a remote phone terminal having a display includes converting the messages at the source into a format compatible with transmission via a signaling channel of the telecommunications line having at least one digital user data channel in addition to the signaling channel. In an ISDN environment, the signaling channel is a D-channel and the user data channel is a B-channel. The user data sent via the D-channel define a message that is unrelated to forming, maintaining, or terminating the call. Nevertheless, the converted messages are transmitted via the signaling channel for presentation at the display, rather than the user data channel or channels.

In one embodiment, the converted user data are menu options of an interactive voice response unit. Optionally, a message is stored as both a text string in a text file and as voice information in a speech file that is associated with the text file. Within this multimedia embodiment, the text file is transmitted via the D-channel and the speech file is transmitted via the B-channel such that the visual presentation of the messages by means of the phone display is synchronized with the conventional audio presentation at the remote telephone. The conversion of the messages formats the information for the visual presentation at the display of the remote phone terminal. Again referring to the ISDN environment, the formatting may be achieved by embedding the menu information into DISPLAY Information Elements (IEs) or into containers (i.e., envelopes) of user-to-user information compatible with D-channel transmission, so that digital character strings are sent for display in realtime at a remote ISDN display phone. The visual presentation may be simultaneous with audio presentation of the menu options in order to increase comprehensibility or to accommodate the hearing impaired.

In another embodiment, the user data are facsimile documents and the source is a facsimile server. The conversion of the facsimile documents into a format for transmission via the signaling channel includes utilizing character recognition techniques. The reformatted user data can then be embedded into the D-channel DISPLAY IEs or user-to-user IEs for realtime display on an ISDN display phone. Preferably, the facsimile server is responsive to signaling from the remote phone, so that the user determines the rate of transmission. The user may then scroll through the facsimile document.

In another embodiment, the user data are voicemail messages from a voicemail server. The conversion of the messages includes utilizing speech recognition techniques. For each of the facsimile and voicemail embodiments, a menu of the available messages may be displayed to the user prior to transmission, allowing the user to select among the available messages. For example, header information that identifies the content or the originating party of a facsimile or voicemail message may be embedded into the DISPLAY IEs for transmission via the D-channel.

DETAILED DESCRIPTION

Figure 1:
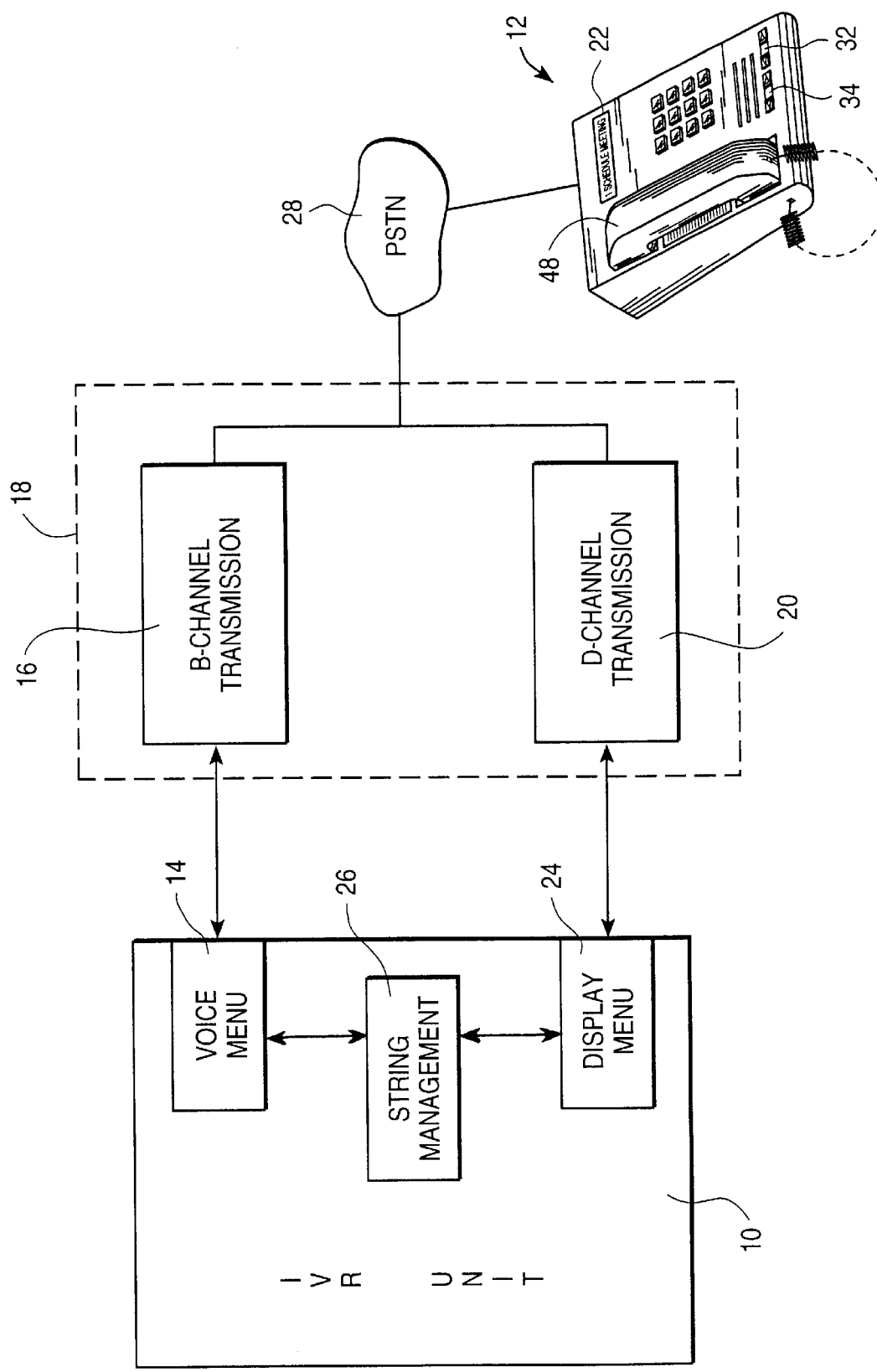
FIG. 1 is a block diagram of apparatus for sending user data of an interactive voice response unit in accordance with one embodiment of the invention.

With reference to FIG. 1, an interactive voice response (IVR) unit 10 includes both voice prompt capability and visual display capability with respect to the presentation of menu options of a decision tree. Consequently, a caller at a display phone 12 may receive visual prompts, audio prompts, or both. In response, the caller identifies the selection by depression of a particular button on the telephone keypad. The IVR unit includes receivers that detect which keypad button has been depressed by a user at a remote telephone. Signal exchange by means of keypad manipulation is well known in both digital and analog telecommunications; e.g., dual tone multifrequency (DTMF) detection in an analog environment, and keypad IEs (Information Elements) in a digital environment.

The IVR unit 10 includes a conventional voice menu 14 that stores and replays voice information relating to possible menu choices. At a first level of the decision tree, an IVR unit for selecting movies may present menu options of the types of available movies, e.g. "suspense" or "comedy." The caller at the display phone 12 selects the type by depression of the appropriate button on the keypad. Based upon the selected type, the second level presents particular movies that are available.

In FIG. 1, the voice information is transmitted to the display phone 12 via one or more B-channels 16 of an ISDN interface 18. However, the use of ISDN telecommunications is not critical to the invention. Other links which include one or more user data channels in addition to a signaling channel may be substituted for the ISDN interface 18. The signaling channel in FIG. 1 is a D-channel 20 that is utilized in the conventional manner to transmit connectivity-related messages, such as CONNECT, ACKNOWLEDGE, DISCONNECT, and RELEASE signals. In addition to the exchange of connectivity-related signals that are transparent to the caller, the D-channel is conventionally used to transmit connectivity-related signals that are apparent to the caller by presentation at a display 22 of the telephone 12. Such signals are DISPLAY IE messages or a container (i.e., envelope) having user-to-user information, and may be used to identify a party calling the display phone. In further addition to the signaling information that is conventionally exchanged via a signaling channel, such as the D-channel, the present invention employs the signaling channel to transmit user data that is typically reserved for user data channels, such as the B-channel 16. In the embodiment of FIG. 1, the user data information that is transmitted over the D-channel is character strings indicative of the menu options of the IVR unit 10.

The IVR unit 10 includes a display menu 24 that generates the character strings that are associated with the menu options. In the preferred embodiment, the voice prompts and display prompts are presented simultaneously. However, this is not critical. In fact, the audio presentation of the IVR information is not required. The character string may be a sequence of ASCII characters embedded in DISPLAY IEs or user-to-user IEs in the D-channel 20. In the embodiment of FIG. 1, a string management device 26 is included. The device may be used to regulate the option presentation. For example, a caller at the display phone 12 may be allowed to selectively scroll through the available options by manipulating the display phone to transmit signals to the IVR unit 10. Typically, the string management device 26 is a component of the IVR unit. Information exchanged between the IVR unit and the display phone 12 passes through a public switched telephone network (PSTN) 28 and/or private branch exchange (PBX), as is well known in the art.

Figure 2:
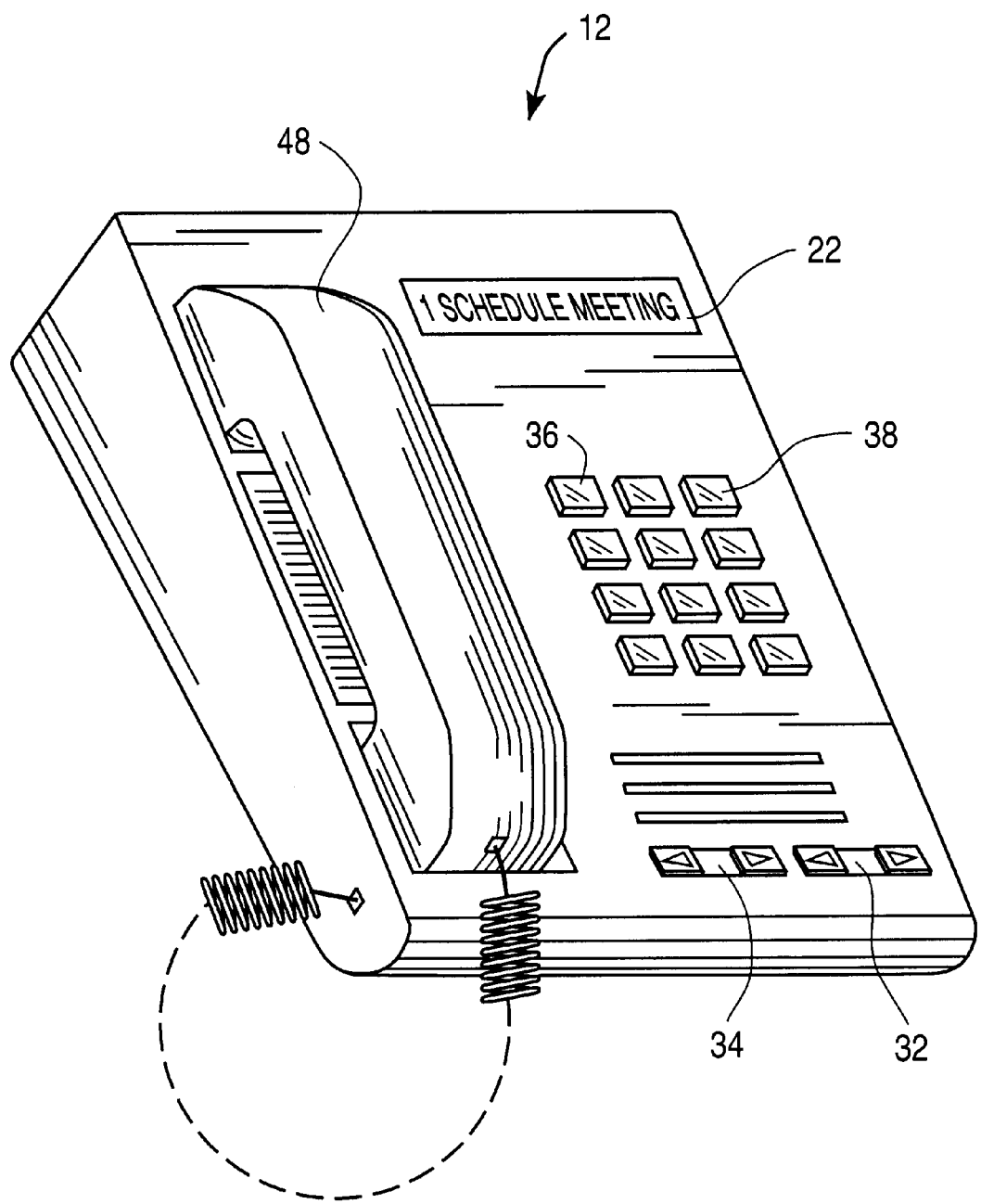
FIG. 2 is a perspective view of a prior art ISDN display phone for use in receiving messages from the apparatus of FIG. 1.

FIG. 2 illustrates the features of the ISDN display phone 12. The telephone includes the small-screen display 22 for presenting alphanumeric characters. The display allows the presentation of different options in a one-by-one time sequence. While not critical, the phone may include a first control button 32 that allows a user to scroll through the options. Pressure at one side of the control button 32 will cause a forward scrolling through the available options, while pressure at the opposite side of the control button will allow a user to scroll in reverse order. The indication of a selection of one of the options may be provided by depression of a second control button 34. However, the conventional method of selecting among options presented by an IVR unit is to depress designated buttons of the keypad. For example, depression of the "1" key 36 will indicate a different option than depression of the "3" key 38.

Figure 3:
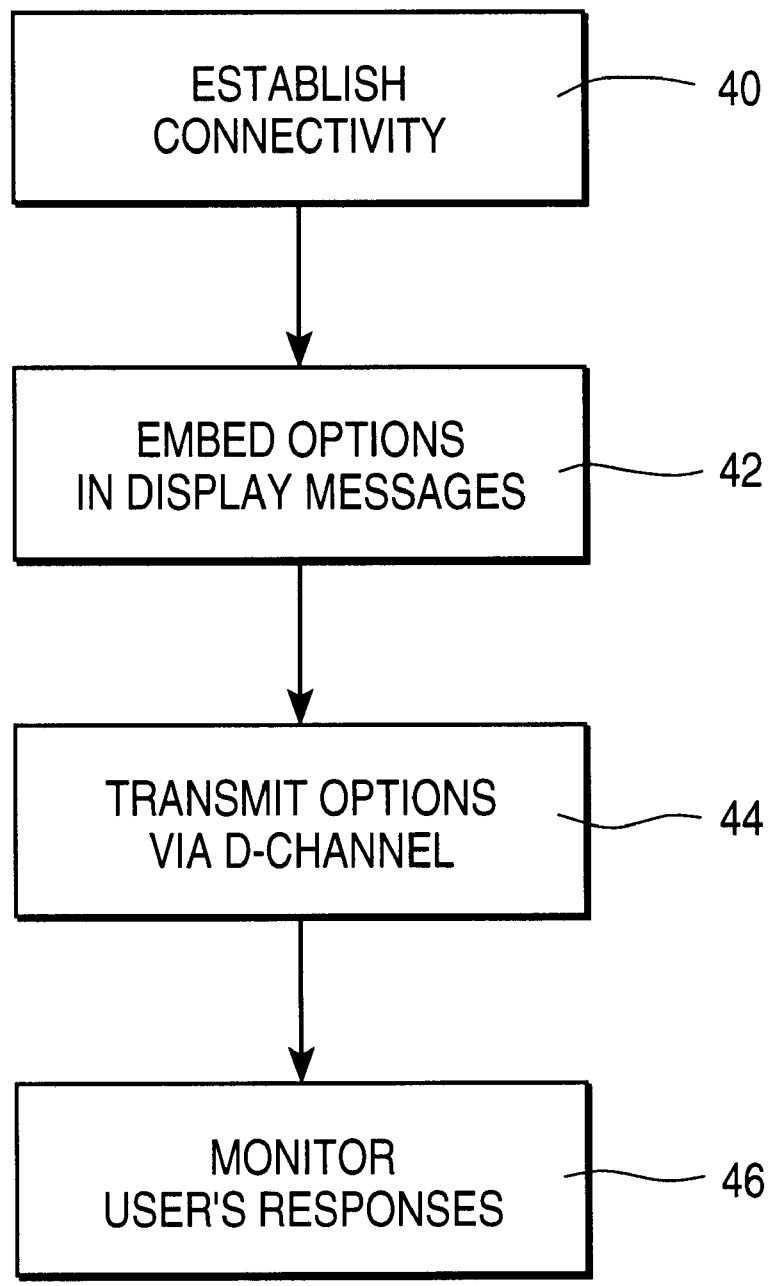
FIG. 3 is a process flow of steps for utilizing the apparatus of FIG. 1.

A simplified method of implementing the IVR embodiment is shown in FIG. 3. A caller at the ISDN display phone 12 of FIGS. 1 and 2 initiates connectivity with the IVR unit 10 via the PSTN 28, as shown at step 40. After the call has been setup, the IVR unit transmits the available options. In the preferred embodiment, the voice menu 14 transmits the options over the B-channel 16 of the interface 18 simultaneously with the character strings from the display menu 24. Each menu option is associated with a character string to be sent out in a DISPLAY message, as shown at steps 42 and 44. As previously noted, the DISPLAY message may be in the form of a user-to-user container or a DISPLAY IE. Visual prompts are presented to the caller in the conventional display 22 of the ISDN phone 12. In step 46, the IVR monitors the selections made by the caller and processes the selections using known techniques.

One advantage of the use of visual prompts utilizing readily available telephones 12 is that no expensive and specialized equipment is required at the IVR unit 10 in order to allow access by the hearing impaired. Because ISDN display phones are used to access the information by implementation of BRI/PRI connectivity, telecommunication devices for the deaf (TDD) are not required. Preferably, the visual prompts are transmitted regardless of the hearing capability of the caller. The use of visual prompts has potential benefits to all callers, particularly if the menu options are complex.

While the ISDN phone 12 has been described and illustrated as having the display 22 integrally formed with the housing that connects to the handset 48, this is not critical. Optionally, the display phone may be a phone emulation device, such as a personal computer that is software driven to display telecommunication messages received via a D-channel.

Figure 4:
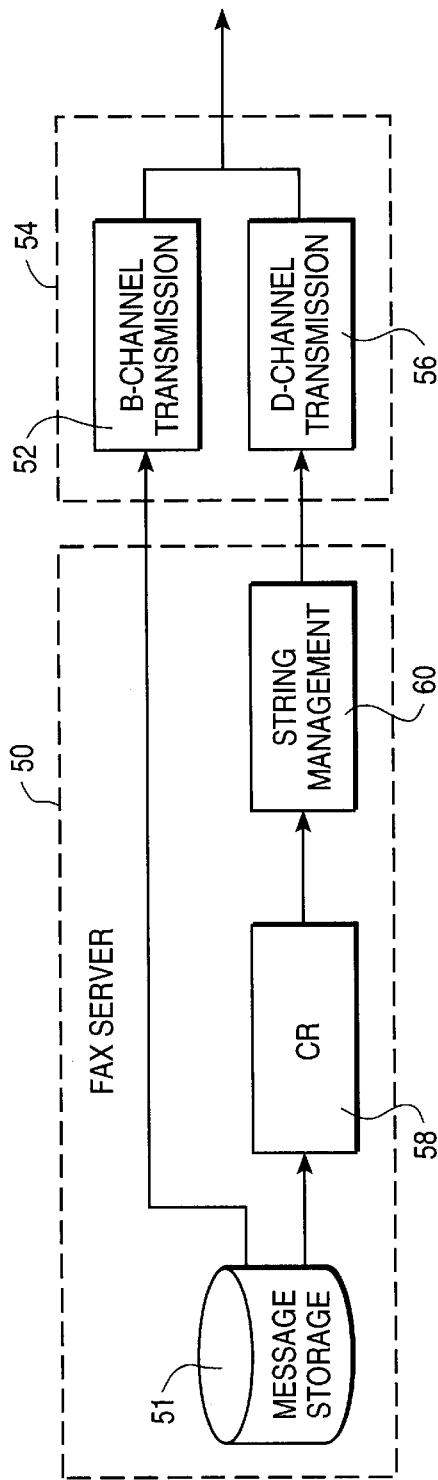
FIG. 4 is a block diagram of an apparatus for sending user data from a fax server in accordance with a second embodiment of the invention.

FIG. 4 illustrates another embodiment of the invention. In this embodiment, the display of an ISDN phone is used to present facsimile documents from a fax server 50. The fax server is connected to a B-channel 52 of an ISDN interface 54 to allow conventional transmission of facsimile documents to a facsimile machine or a personal computer having modem capability. However, if the apparatus detects that the person who desires access to a document is located at a display phone, a D-channel 56 of the interface is utilized to transmit the documents from a fax message storage 51. A character recognition (CR) module 58 can be used to convert the document to character strings that are embedded into DISPLAY messages to a display phone of the type shown in FIG. 2. Preferably, the transmission presents the document in realtime and in a line-by-line fashion, allowing the caller to scroll through the document. A string management module 60 may be responsive to signals from the ISDN phone such that the caller determines the pace of the presentation of the character strings. In FIG. 2, the first control button 32 may be used to scroll forwardly or rearwardly through the document.

Figure 5:
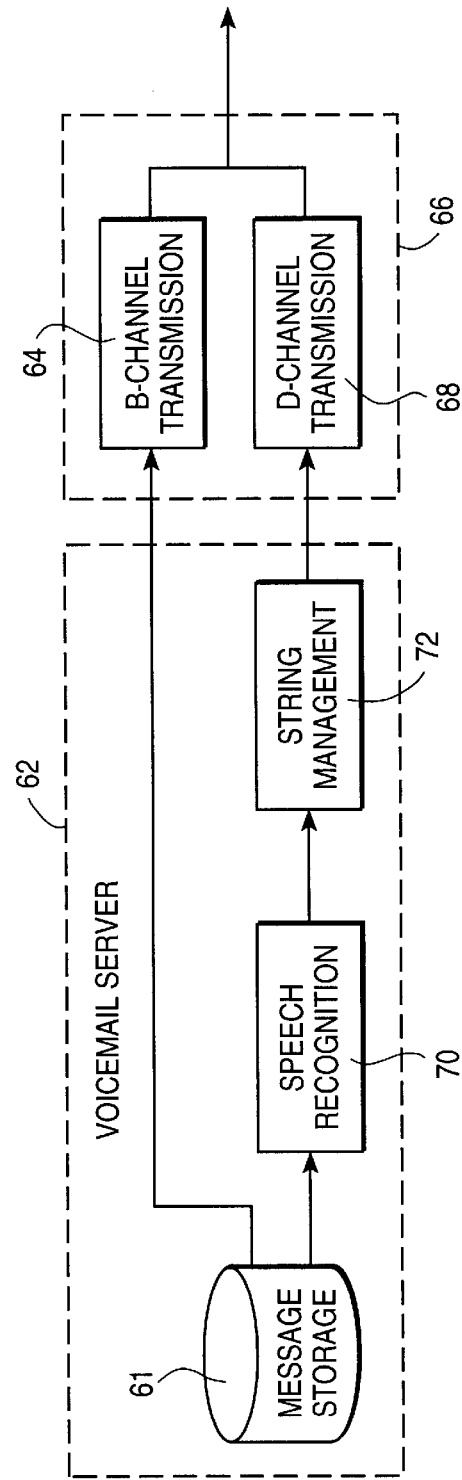
FIG. 5 is a block diagram of an apparatus for sending user data from a voicemail server in accordance with a third embodiment of the invention.

An equivalent operation may take place with respect to retrieving voicemail messages. Referring now to FIG. 5, a voicemail server 62 having message storage 61 is connected to a B-channel 64 of an ISDN interface 66 to accommodate message retrieval in the conventional manner. Additionally, the voicemail server is connected to the D-channel 68 of the interface by means of a speech recognition module 70 and a string management module 72. When the apparatus of FIG. 5 identifies a calling party as being at a display phone, the messages from the voicemail server may be sent to the speech recognition module 70 and the string management module 72 to transmit the messages either simultaneously with the voice transmission or independently of the voice transmission. The speech recognition module converts the recorded voicemail message into text form, such as ASCII characters, while the string management module embeds the resulting text information into DISPLAY messages compatible with transmission over the D-channel. Optionally, multimedia messages are stored at the voicemail server or other voice processing server (e.g., an IVR), so that there are associated speech and text files. The conventional speech file is transmitted via the B-channel 64 for synchronized presentation of the text that is transmitted via the D-channel 68.

Figure 6:
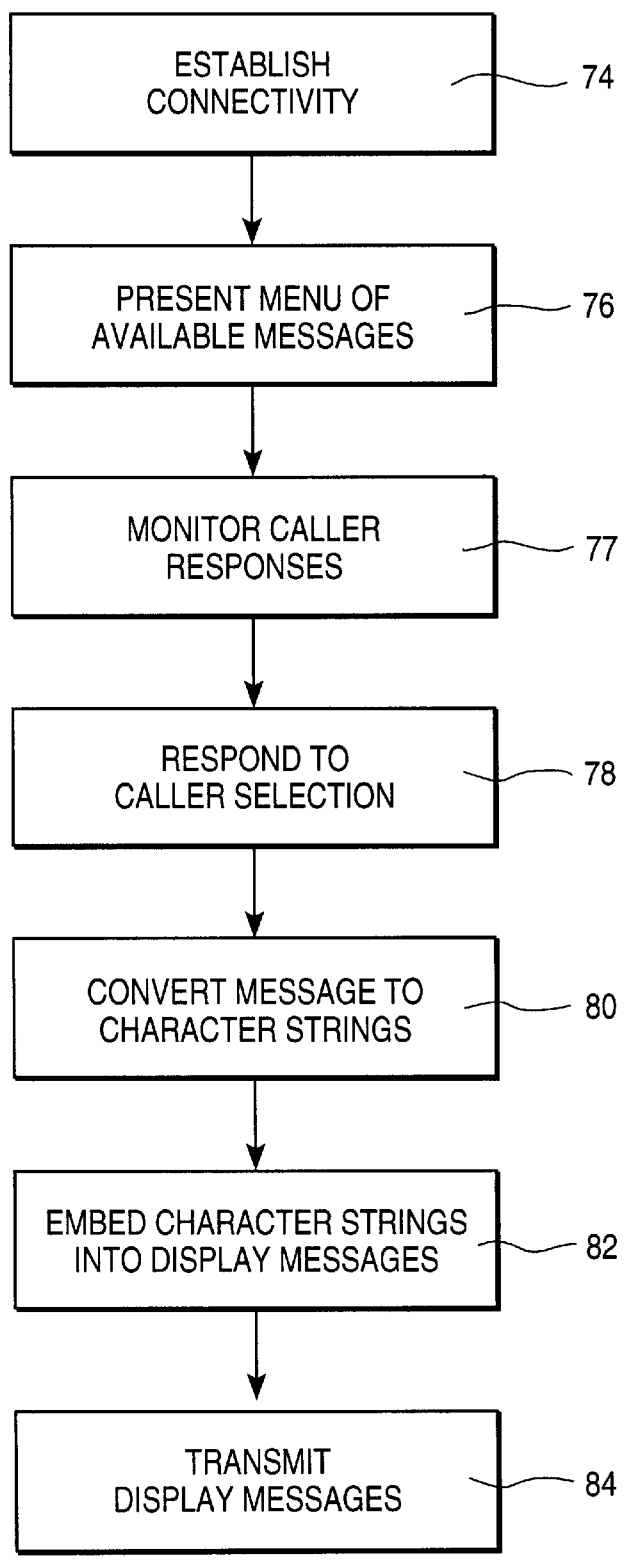
FIG. 6 is a process flow of steps for utilizing the apparatus of FIG. 4 or the apparatus of FIG. 5.

FIG. 6 illustrates process steps for implementing the fax-sending and voicemail-sending techniques for FIGS. 4 and 5. In step 74, connectivity is established. Typically, this is a call from a display phone, such as the one shown in FIG. 2 or a soft phone, to the facility which includes the appropriate server 50 and 62. When the server detects that the caller is at a display phone, the CR module 58 or the speech recognition module 70 is activated.

Optionally, step 76 is included to present a menu of available messages. For example, header information of each of a number of different voicemail messages may be transmitted via the D-channel 68 to the display phone. The header information may identify the subject of the message, the author of the message, or both. If the implementation of the message-sending process includes step 76, the server is responsive to a selection by the caller. Step 77 is a step of monitoring the connection for the caller's response. At step 78, the appropriate response is implemented. Based upon the header information that is displayed at the display phone, the caller may select among the available messages for a fulltext display.

In step 80, the selected message is converted to character strings that are in the format for transmission via the D-channel. The character strings are embedded into DISPLAY messages in step 82. The DISPLAY messages are transmitted in step 84 to the display phone for visual presentation to the caller.

An advantage of the facsimile embodiment of FIG. 4 is that facsimile documents can be retrieved from a facsimile server 50 without requiring access to a facsimile machine or a personal computer having modem capability. A conventional display phone may be utilized. Another advantage is that the apparatus may be used to allow a caller to scroll through a fax document without requiring the document to be fully downloaded to internal memory at the location of the calling party.

An advantage of the voicemail embodiment of FIG. 5 is that voicemail messages may be simultaneously presented audibly and visually. This may be particularly important to the hearing impaired and to a party receiving a voicemail message in a language that is not the native language of the party.

While the embodiments of FIGS. 1, 4 and 5 are shown as being implemented separately, this is not critical. Optionally, the fax server 50, the voicemail server 62, and the IVR unit 10 are housed within a single message center. The use of ISDN connectivity is not critical, since other communication techniques that allow DISPLAY messages to be carried along a signaling channel that is separate from the user data channel or channels may be employed in the manner described above.

What is claimed is:

1. A telecommunications method of sending user data during a call between a source and a remote phone terminal having a display, said method comprising steps of:

establishing connectivity between said source and said phone terminal utilizing a telecommunications line having at least one digital user data channel and having a digital signaling channel, including exchanging call connectivity messages via said signaling channel;

transmitting said user data via said user data channel;

converting selected user data at said source into a format compatible with transmission via said signaling channel for visual presentation of said selected user data at said display of said remote phone terminal, said selected user data being at least a portion of said user data transmitted via said user data channel; and transmitting said converted user data from said source utilizing said signaling channel, thereby providing dual transmissions of at least said portion of said user data transmitted via said user data channel.

2. The method of claim 1 wherein said step of converting said selected user data includes forming digital character strings representative of menu options of an interactive voice response unit, said character strings being formatted for visual presentation at said display and wherein said step of transmitting said user data via said user data channel includes formatting said user data for audible presentation at said remote phone terminal.

3. The method of claim 1 wherein said step of converting said selected user data includes forming digital data representative of facsimile messages stored at said source, said digital data being transmitted via said signaling channel.

4. The method of claim 3 wherein said step of forming said digital data representative of facsimile messages includes utilizing character recognition processing to convert said facsimile messages.

5. The method of claim 1 wherein said step of converting said selected user data includes forming digital data representative of a voicemail message, said digital data being transmitted via said signaling channel.

6. The method of claim 5 wherein said step of forming said digital data includes utilizing speech recognition processing to convert said voicemail message into said format compatible with transmission for visual presentation at said display of said remote phone terminal.

7. The method of claim 1 wherein said step of establishing connectivity includes utilizing an ISDN line, said signaling channel being a D-channel.

8. The method of claim 7 wherein said step of converting said selected user data includes forming DISPLAY information elements (IEs) for transmission via said D-channel.

9. The method of claim 3 further comprising a step of sending a menu of facsimile messages accessible at said source for visual presentation at said display, including transmitting said menu in a format compatible with visual presentation at said display, said step of transmitting said converted user data being responsive to an input from said remote phone terminal such that said input is indicative of a selected facsimile message from said menu.

10. The method of claim 5 further comprising a step of sending a menu of voicemail messages accessible at said source for visual presentation at said display, including transmitting said menu in a format compatible with visual presentation at said display, said step of transmitting said converted user data being responsive to an input from said remote phone terminal such that said input is indicative of a selected voicemail message from said menu.

11. The method of claim 1 further comprising a step of storing a speech file indicative of a message of a voice processing server, said selected user data that are converted and transmitted utilizing said signaling channel being a text file which is associated with said speech file, said step of transmitting said converted user data being synchronized with transmitting said speech file via one of said digital user data channels.

12. A method of transmitting ISDN B-channel user data to an ISDN display phone utilizing a connection having at least one B-channel for exchanging said user data and having a D-channel for exchanging protocol messages, said method comprising steps of:

formatting a subset of said user data into a plurality of text-related character strings indicative of said subset of said user data, said subset of said user data being unrelated to ISDN protocol messages;

tagging each of said text-related character strings as DISPLAY messages for transmission via said D-channel;

displaying said subset of said user data at said ISDN display phone by sending said DISPLAY messages; and transmitting said user data over one of said B-channels in the absence of formatting said user data into said plurality of said text-related character strings so that said subset of said user data is transmitted over both said D-channel and said one of said B-channels.

13. The method of claim 12 wherein said step of formatting said subset of said user data includes converting one of a voicemail message or a menu tree of an interactive voice response unit into a sequence of said text-related character strings for display at said ISDN display phone by transmission across said D-channel.

14. The method of claim 13 further comprising a step of transmitting speech information across at least one of said B-channels substantially simultaneously with transmission of said text-related character strings via said D-channel, thereby enabling substantially simultaneous audio and visual presentation of said user data.

15. The method of claim 12 wherein said step of formatting said subset of said user data includes converting a facsimile message into a sequence of said text-related character strings for display at said ISDN display phone.

16. An apparatus for sending messages to remote ISDN display phones comprising:

an interface to an ISDN, said interface providing a plurality of B-channels for exchanging user data and a D-channel for exchanging ISDN protocol messages, including DISPLAY messages to which said ISDN display phones are responsive;

memory having stored messages, said stored messages being user data including facsimile messages;

means connected to said memory for converting at least portions of said user data of said stored messages which include said facsimile messages to display information signals in a format compatible with transmission via said D-channel for display at said ISDN display phones as character strings, said means for converting having an output connected to said D-channel; and first means connected to said converting means for transmitting said display information signals via said D-channel.

17. The apparatus of claim 16 further comprising second means operatively associated with said memory for transmitting selected user data of said stored messages as voice information signals via said B-channels, said selected user data being transmitted over said D-channel as display information signals by said first means and being transmitted over said B-channel as voice information signals by said second means.

18. The apparatus of claim 16 wherein said first means for converting includes a speech recognition module and wherein said stored messages include voicemail messages.

19. The apparatus of claim 16 further comprising an interactive voice response device connected to said interface to transmit menu options in a format compatible with auditory presentation at said remote ISDN display phones, said stored messages including said menu options for visual presentation at said remote ISDN display phones.

20. The apparatus of claim 16 wherein said first means for converting forms an output of DISPLAY information element (IE) messages.

* * * * *